J. H. DRAKE.
PACKING FOR AUTOMOBILE AND OTHER AXLES.
APPLICATION FILED OCT. 21, 1916.

1,237,880.

Patented Aug. 21, 1917.

UNITED STATES PATENT OFFICE.

JERRY H. DRAKE, OF THOMASVILLE, GEORGIA.

PACKING FOR AUTOMOBILE AND OTHER AXLES.

1,237,880.     Specification of Letters Patent.     Patented Aug. 21, 1917.

Application filed October 21, 1916. Serial No. 126,840.

*To all whom it may concern:*

Be it known that I, JERRY H. DRAKE, a citizen of the United States, residing at Thomasville, in the county of Thomas and State of Georgia, have invented certain new and useful Improvements in Packings for Automobile and other Axles; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to an improvement in packing, proposing a construction which is especially adapted for automobile axles and their bearings, but which may also be adapted for analogous or kindred applications to prevent the escape or loss of the oil or grease in which the bearings run and also to protect the bearings against dust.

The principal objects of the invention are to provide a packing for the purposes stated which shall be simply constructed, durable and wear compensating; which may be employed in connection with any existing type of roller bearing, whose individual parts are readily accessible and renewable as the occasion may require; and which has marked efficiency for its contemplated purpose.

With the foregoing objects and advantages in view the invention consists in features of construction and combination of the yieldable or compressible packing rings and their associated parts as will more fully appear from the succeeding description.

A preferred embodiment of the invention is illustrated in the accompanying drawing, wherein.

Similar characters of reference designate corresponding parts throughout the several views.

Figure 1:
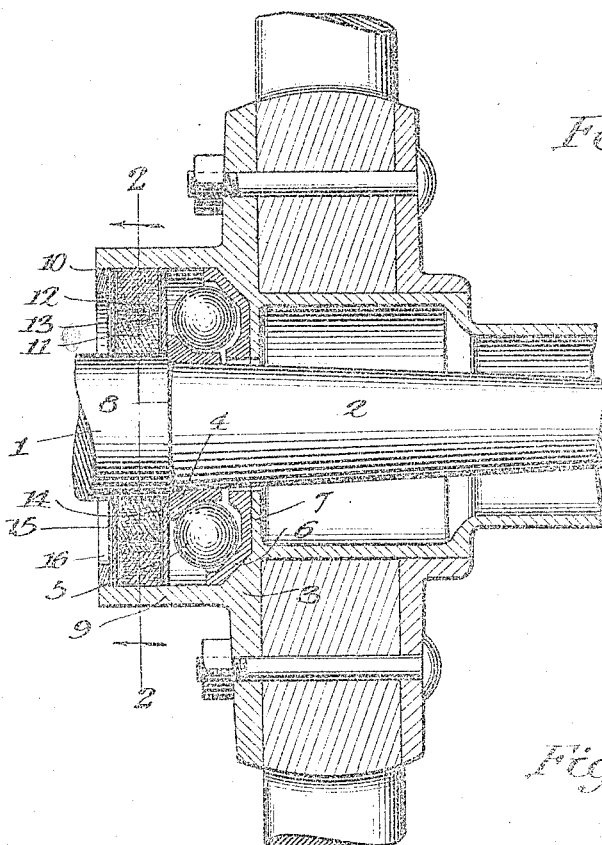
Figure 1 is a longitudinal sectional view showing the improved packing as applied to an automobile axle.
Figure 2:
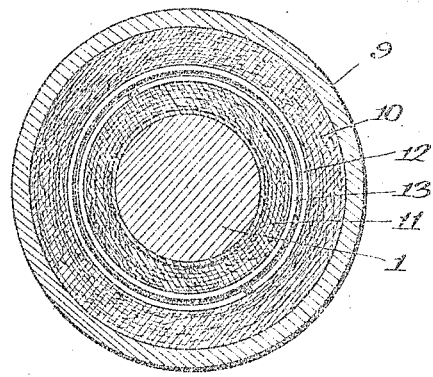
Fig. 2 is a sectional view on the line 2—2 of Fig. 1.
Figure 3:
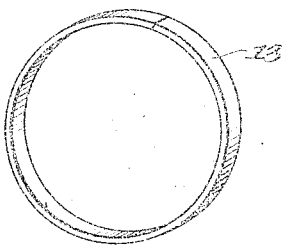
Fig. 3 is a perspective view showing the construction of the springs which act on the yieldable or compressible packing rings.

Fig. 1 of the drawing shows an automobile axle whose spindle 2 projects into a wheel hub 3 and is journaled in a bearing of approved construction, that shown comprising the cone 4, balls 5 and thrust ring 6 which bears against an internal web or flange 7 of the hub 3. The spindle 2 forms an annular shoulder 8 with the axle 1 which provides a seating for the cone 4. The bearing is housed within an extension 9 of the hub 3 and said extension also incloses and co-acts with the packing which constitutes the invention.

The improved packing comprises coplanar and concentric rings 10 and 11 of yieldable or compressible packing material, preferably felt. The outer ring 10 is pressed against the hub extension 9 and the inner ring 11 is pressed against the axle 1. The means employed to hold the rings 10 and 11 in strong and uniform contact with the hub extension and axle preferably consist of annular split springs 12 and 13, the former being arranged within the ring 10 and acting expansively and the latter surrounding the ring 11 and acting with contractile effect. The spring rings 12 and 13 are preferably of less width than the packing rings 10 and 11 and are arranged symmetrically of the central plane of said packing rings whereby no metal is presented at the side faces thereof.

The spaces between the packing rings are sealed and the rings themselves are protected against access of dust and oil by flat washers 14 and 15 which surround the axle 1 and bridge the space between said axle and the inner face of the hub extension 9, the inner and outer edges of said washers being very close to the concentric faces of the axle and the hub extension. Since no metal is presented at the sides of the packing rings, the washers 14 and 15 may be held in strong contact with said rings, preferably exerting a measure of lateral compression thereon. In the embodiment disclosed the washer 14 bears against the cone 4 and the washer 15 receives the thrust of an adjusting nut or follower 16 threaded within the hub extension 9. Obviously, by suitably tightening the nut or follower 16 against the washer 15, both washers 14 and 15 may be held with desired or necessary pressure against the opposite sides of the packing rings.

The washer 14 protects the packing rings against access of oil and the washer 15 protects them against access of dust. The packing as an entirety protects the bearing against access of dust; and the washers together with the springs 12 and 13 cause the packing rings to efficiently prevent oil or grease from escaping from the bearing along the surfaces of the hub extension and the axle. In this way the packing provides a substantially oil-tight end wall or closure for the bearing housing without, however, in any way impairing the efficiency of the bearing.

Having described my invention and set forth its merits, what I claim is:

1. The combination of an axle and a bearing housing into which the axle projects of a packing constituting a substantially oil-tight end closure for said housing and including co-planar concentric packing rings, the outer of which contacts with the housing and the inner of which contacts with the axle.

2. The combination of an axle and a bearing housing into which the axle projects of a packing constituting a substantially oil tight end closure for said housing and including co-planar concentric packing rings and spring means acting on the outer ring to press it into uniform contact with the bearing housing and on the inner ring to press it into uniform contact with the axle.

3. The combination of an axle and a bearing housing into which the axle projects of a packing constituting a substantially oil-tight end closure for said housing and including co-planar concentric packing rings, the outer of which contacts with the housing and the inner of which contacts with the axle and washers held in contact with the opposite faces of said rings and bridging the space between said axle and bearing housing.

4. The combination of an axle and a bearing housing into which the axle projects of a packing constituting a substantially oil-tight end closure for said housing and including co-planar concentric packing rings and spring rings acting on said packing rings, one spring ring being arranged within the outer packing ring and acting expansively to hold it in contact with the bearing housing and the other spring ring surrounding the inner packing ring and acting with contractile effect to hold it in contact with the axle.

5. The combination of an axle and a bearing housing into which the axle projects of a packing constituting a substantially oil tight end closure for said housing and including co-planar concentric packing rings, spring rings acting on said packing rings, one spring ring being arranged within the outer packing ring and acting expansively to hold it in contact with the bearing housing and the other spring ring surrounding the inner packing ring and acting with contractile effect to hold it in contact with the axle, said spring rings being of less width than said packing rings and arranged whereby no metal is presented at the sides of said packing rings and washers held in contact with the opposite faces of said packing rings and bridging the space between said axle and said bearing housing.

6. The combination of an axle and a bearing housing into which the axle projects of a pair of juxtaposed packing rings, one held in contact with the axle and the other held in contact with said bearing housing, and washers at opposite sides of the packing held in contact with the adjacent faces of said rings and bridging the space between said axle and said bearing housing.

7. The combination of an axle and a bearing housing into which the axle projects of a pair of juxtaposed packing rings and spring rings combined therewith for holding them respectively in contact with said axle and bearing housing, one spring ring surrounding its associated packing ring and acting with contractile effect, and the other spring ring being fitted within its associated packing ring and acting expansively.

8. The combination of an axle and a bearing housing into which the axle projects of a pair of juxtaposed packing rings, spring rings combined therewith for holding them respectively in contact with said axle and bearing housing, one spring ring surrounding its associated packing ring and acting with contractile effect, and the other spring ring being fitted within its associated packing ring and acting expansively, and washers at opposite sides of the packing held in contact with the adjacent faces of said packing rings and bridging the space between said axle and said bearing housing.

In testimony whereof I affix my signature in presence of two witnesses.

JERRY H. DRAKE.

Witnesses:
 ELLEN L. QUARTERMAN,
 G. M. SMITH.